Oct. 29, 1968    D. M. SANDEFUR    3,407,919
MULTIPLE-STATION WORK SUPPORTING AND ADVANCING APPARATUS
Filed March 14, 1967    2 Sheets-Sheet 1
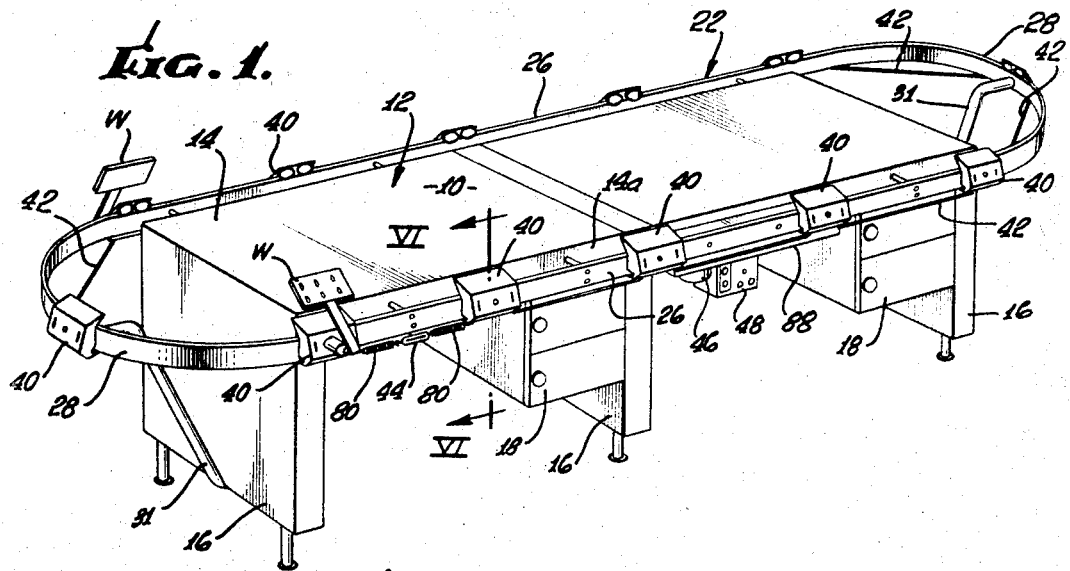
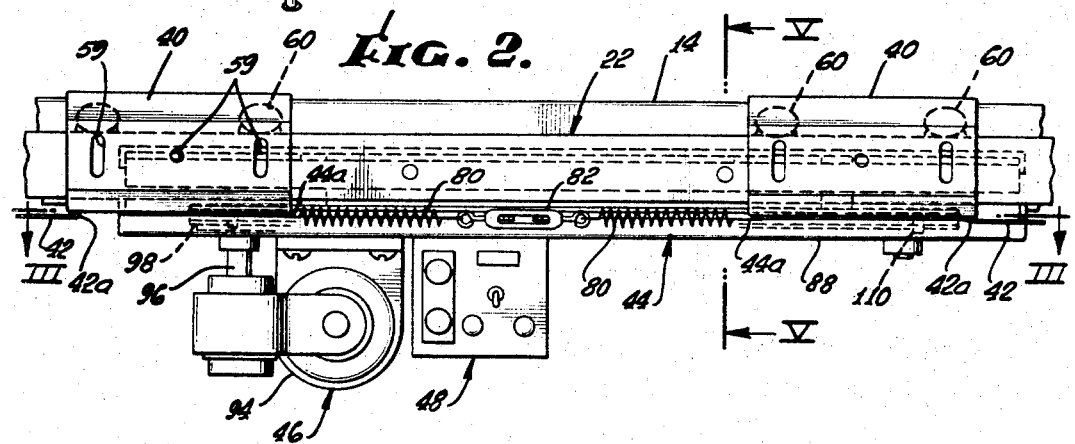
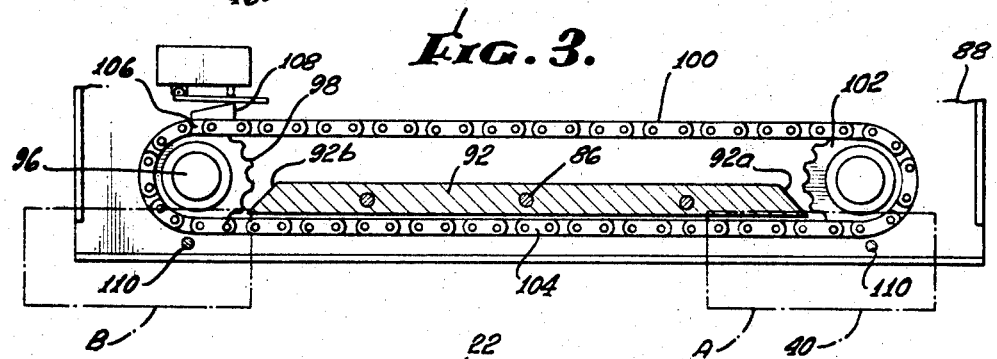
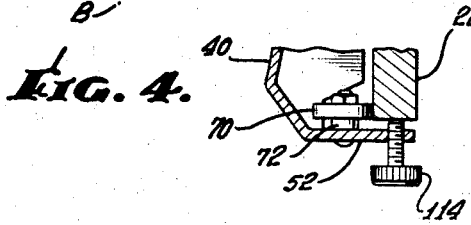
INVENTOR.
DOUGLAS M. SANDEFUR
BY
Miketta, Glenny, Powe & Smith
ATTORNEYS.

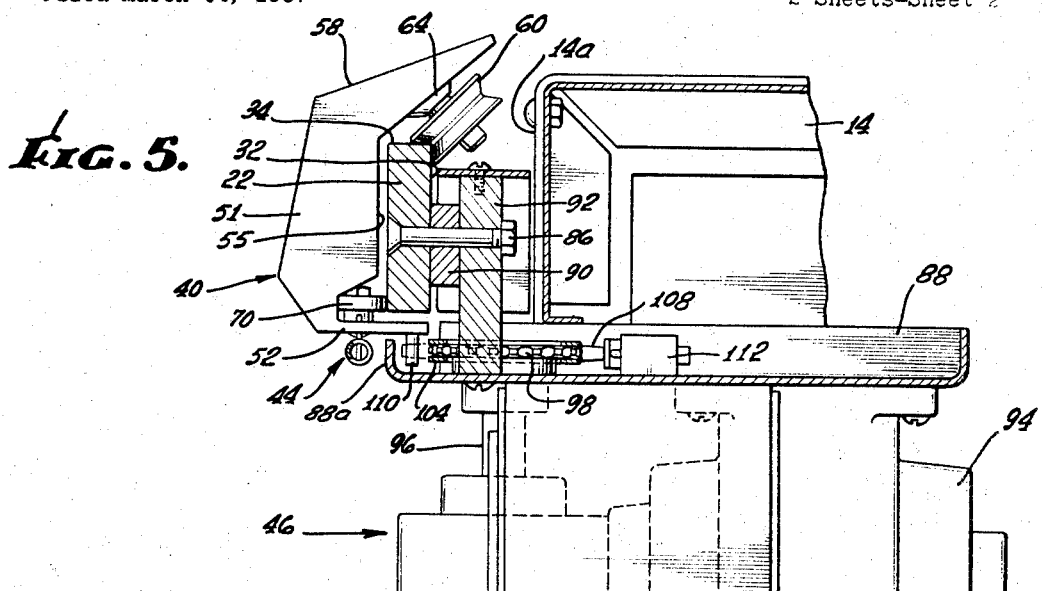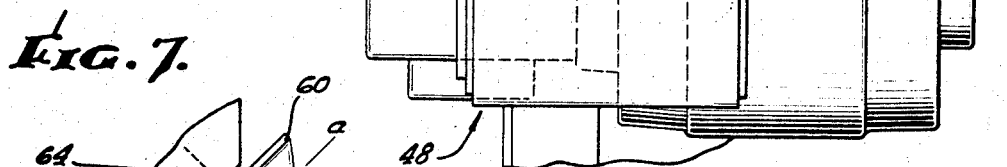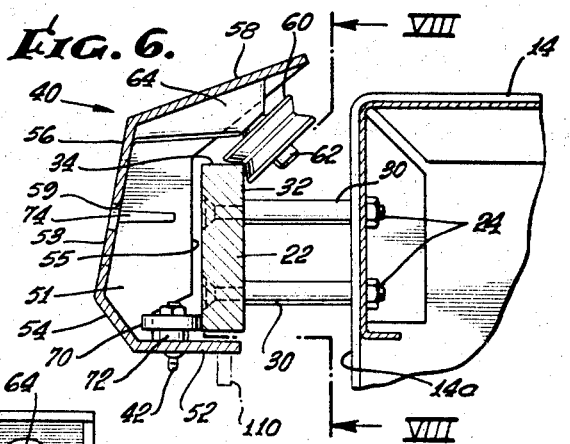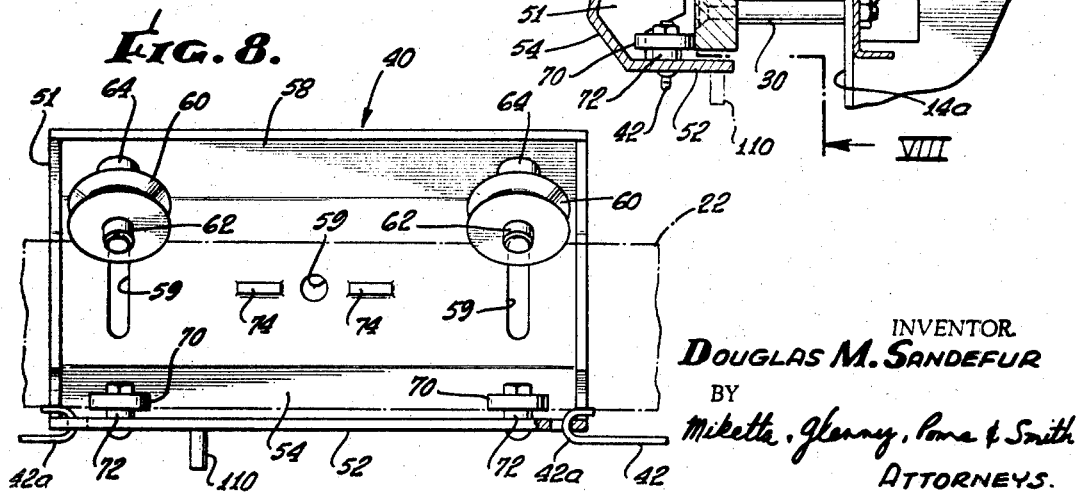

United States Patent Office 3,407,919
Patented Oct. 29, 1968

3,407,919
MULTIPLE-STATION WORK SUPPORTING AND ADVANCING APPARATUS
Douglas M. Sandefur, Los Angeles, Calif., assignor to Sandefur Engineering Co., Inc., Lawndale, Calif., a corporation of California
Filed Mar. 14, 1967, Ser. No. 622,971
11 Claims. (Cl. 198—129)

ABSTRACT OF THE DISCLOSURE

Apparatus for supporting and advancing workpieces relative to multiple work stations. The apparatus includes a work table providing work stations arranged at spaced intervals around the table. A continuous looped track which is secured around the edge of the table extends past the stations and supports workholding carriages that are selective movable along the track from station to station. The carriages are connected together in a continuous looped train for common movement. The train may be advanced at selected time intervals to position each carriage at successive work stations.

---

In a number of situations it is desirable to move a workpiece or item to a succession of work stations, at each of which work is performed on the item by a different operator. One type of prior construction which has been used to perform this function, particularly in a limited space, includes generally a work bench or table providing a number of work stations arranged around the work table. A track or conveyor on which the workpieces are movably supported extends generally around the table so that the workpieces may be advanced from station to station.

Prior constructions of this nature have produced various problems however, particularly in connection with curved sections of the track or conveyor. While various movable work supports or carriages will operate effectively on a straight run, they will not necessarily operate satisfactorily on a curved section of track. For example, there may be a tendency for the carriage to become disengaged in whole or in part from the curved section of track, which results in delay and possible jamming or damage to the apparatus. On the other hand, supports constructed to prevent disengagement through the curves may provide a great deal of friction or resistance, raising power requirements and the like. Further, various prior constructions have been particularly complicated and expensive to construct and maintain; have lacked flexibility and ease of assembly (and disassembly); and have been subject to frequent malfunction or breakdown.

The present invention broadly contemplates a simple economical and versatile multi-station work-advancing construction or apparatus which is particularly adapted for a curved track system.

Accordingly, it is a principal object of the present invention to provide a novel and an improved multi-station work-advancing construction or unit.

It is a further object of the present invention to provide such a construction which is particularly adapted for use with a curved track system.

Further objects of the present invention are to provide such a construction which is simple and economical to construct and maintain; which is easily and quickly assembled and disassembled; which is selectively adjustable for varied conditions; and which combines low resistance operation with secure support for the movable work supports.

Other advantages of the invention will become more apparent from the following detailed description and the associated drawings.

In the drawings:

FIG. 1 is a perspective view of a multi-station work-advancing construction or unit which embodies the present invention;

FIG. 2 is an enlarged fragmentary side view of a portion of the construction shown in FIG. 1, showing in particular the drive and control means for the construction;

FIG. 3 is a horizontal section taken generally along the plane indicated by line III—III of FIG. 2;

FIG. 4 is a fragmentary side sectional view of a modified form of carriage;

FIG. 5 is an enlarged fragmentary vertical section taken generally along the plane indicated by line V—V of FIG. 2;

FIG. 6 is an enlarged fragmentary vertical section taken generally along the plane indicated by line VI—VI of FIG. 1;

FIG. 7 is a further enlarged fragmentary side view of a portion of FIG. 6, showing a grooved support roller and a portion of the track;

FIG. 8 is a fragmentary vertical section taken generally along the plane indicated by line VIII—VIII of FIG. 6;

FIG. 1 illustrates the presently preferred form of work-advancing construction or unit 10 which includes a generally rectangular elongated work table or bench 12 having a table top 14 and three transversely extending, spaced, vertical leg sections 16. The illustrated table 12 provides two work stations at each side. Each work station may be provided with suitable cabinets or drawers 18 such as are shown mounted to the leg sections 16 beneath the table top 14. Suitable seating means such as chairs (not shown) may be provided at each of the work stations. The work table 12 may be constructed of a suitable material such as metal, plastic or wood.

A continuous looped track 22 is supported generally around the upper edge of the work tabel 12. The illustrated track 22, which is in the shape of an elongated loop having straight or linear side sections 26 and curved generally semicircular end sections 28, is supported with its side sections 26 spaced from the outer surfaces of side edge walls 14a of the table top 14 and with its curved end section 28 extending outwardly from the ends of the table top. As shown best in FIG. 6, the track 22 may be generally rectangular in cross-section and may be secured to the work table by suitable means such as the illustrated nut and bolt combinations 24 extending through the edge wall 14a of the table top 14. Spacers 30 are disposed around the securing bolts 24 between the track and the walls 14a to position the track. A suitable support brace 31 is secured between each track end section 28 and the adjacent table leg section 16. The track 22 thus has a generally vertical inner surface 32 which is spaced from the adjacent side surface of the table. The track 22 also has a generally horizontal upper surface 34 which is positioned slightly below the level of the upper surface of the table top 14. It will be understood that track 22 may have any cross section with a support edge defined by angularly related surfaces.

In brief, a plurality of work-supporting individual carriers or carriages 40 are releasably mounted on the track 22 at spaced intervals therealong. The carriages 40 are connected together in a continuous loop or train and generally maintained in spaced relation to adjacent carriages by interconnecting means in the form of fixed-length connecting means 42 and variable-length connecting means 44. Drive means 46 are provided for moving the carriages 40 around the track 22 and control means 48 are provided to sequentially position the carriages at successive work stations for selected time periods.

The illustrated carriages 40 are alike, so that only one will be described in detail. The carriage 40 has an irregular generally channel shape, as shown best in FIGS.

1, 5 and 6. In its illustrated form it is a single casting which includes a pair of end walls 51, a bottom wall or leg 52, an outer wall or web 53 that includes a lower portion 54 and an upper portion 56, and a top wall or leg 58. When the carriage 40 is mounted or assembled on the track 22, the outer wall 53 is disposed generally outwardly of and parallel to the track 22 and the top and bottom wall 58 and 52 extend inwardly above and below the track. The end walls 51 are formed to receive the track, with a vertical inner edge 55 of each end wall 51 extending adjacent to the outer surface of the track.

To facilitate mounting workpieces in convenient working orientations, the outer surfaces of the assembled carriage 40 are inclined from the vertical and from the horizontal. Thus, the outer surface of the top wall 58 slopes upwardly from front to rear at approximately an angle of 20°. Similarly, the outer surface of portion 56 is tilted rearwardly from the vertical about its lower edge by about 10°. The outer surface of portion 54 is inclined rearwardly from the vertical about its upper edge by about 45°. Suitable means may be provided on the carriage to facilitate attachment of various workpieces and/or workholders W (see FIG. 1); the illustrated carriage is provided with several apertures 59 for this purpose.

The carriage 40 is supported on the track 22 by a pair of support rollers or pulleys 60 having a circumferential grove mounted for free rotation at either side of the upper portion of the carriage. As shown best in FIG. 6, the rollers 60 are rotatably supported on shafts 62 secured as by means of threaded connections to bosses 64 integrally formed beneath the top wall 58 of the carriage. The roller shafts 62 extend inwardly and downwardly at an angle of about 45° from the horizontal so that, as is shown best in FIGS. 6 and 7, the grooves of the rollers 60 tend to seat upon the upper inner edge of the track. The axis of each roller 60 is thus generally normal to a plane $a$—$a$ dividing the angle between the track surfaces 32 and 34 (FIG. 7) which in the exemplary embodiment are related or disposed at a right angle.

As shown best in FIG. 7, it has been found desirable to form the circumferential groove as a V-groove and to make the angle of the V-groove somewhat larger than the 90° angle of the track edge, i.e., the angle between track side and upper surfaces 32 and 34. This tends to provide clearance between the outer portions of the conical surfaces defined by the roller V-grooves and the adjacent surfaces of the track, and minimizes the area of contact between the roller surfaces and the track surfaces. This in turn tends to alleviate drag and resistance which would result between the conical groove surfaces and the planar track surfaces if the respective surfaces were in fuller contact. It is apparent that such drag or sliding occurs when the roller travels in a straight path, because of the difference in velocity of the different diameter proportions of the conical surfaces of the roller groove.

Quite satisfactory results have been achieved through the use of support rollers having a smoothly contoured V-groove defining an angle in the nature of 95°.

The carriage 40, by virtue of its own weight, as well as the weight of the fixtures and workpieces which it supports, tends to pivot counterclockwise (as viewed in FIGS. 5 and 6). As shown in the drawings, the carriage 40 is provided with roller means at its lower portion to engage the track 22 and limit this inward movement while facilitating movement of the carriage along the track. In the illustrated carriage 40, these roller means are provided by a pair of lower guide rollers 70 disposed at either end of the carriage. The guide rollers 70 are supported for free rotation on short vertical shafts 72 extending upwardly from either end of the bottom wall 52. The lower guide rollers 70 extend somewhat inwardly of the inward edges 55 of the carriage end walls 51 that are adjacent the outer face of the track; the rollers 70 thereby engage the lower portion of the front surface of the track to maintain the carriage in a position as shown in FIGS. 5 and 6.

The carriage 40 is thus constructed and arranged so that when it is assembled on the track, it is securely supported and will tend to resist disengagement from the track by direct movement of the carriage in any direction. As noted above, the upper support rollers 60 support the carriage on the track, providing generally low-friction limited-area contact between carriage and track. The rollers 60 also restrict outward movement of the upper end of the carriage. Inward movement of the upper portion of the carriage is limited by the inward edges 55 of the carriage side walls 51, except at the curved ends 28 of the track. Small hubs or projections 74 which extend inwardly from the inner face of the upper portion 56 are provided to perform this function when the carriage is on the curved ends of the track. As noted above, inward movement of the lower portion of the carriage is limited by the lower guide rollers 70. Direct upward movement of the carriage is limited by the lower wall 52.

To remove the carriage 40 from the track, the lower portion of the carriage is merely swung outwardly, from which position the carriage may be readily removed. The carriage is replaced on the track by merely reversing the foregoing steps.

The means interconnecting the carriages in their train or loop include the fixed-length connecting means 42 and the variable-length connecting means 44. As shown best in FIGS. 1 and 8, the connecting means 42 and 44 may be comprised of elongated strands or links having a hook 42a, 44a formed at either end for engaging suitable apertures in the marginal portions of the carriage bottom wall 52 at either end of each carriage. The links 42, 44 are thereby pivotally connected to the carriages below the level of the track and will pivot as necessary as the carriages move around the curved sections 28 of the track. As shown in FIG. 1, the links 42, 44 may extend in straight lines between adjoining carriages as they move around the curved sections. This arrangement avoids having to bend or curve the links 42, 44.

The links 42, 44 may be connected, as shown best in FIG. 5, in general alignment with the axes of the lower rollers 70. Preferably, the links are not connected outwardly of those axes to avoid pulling the lower portion of the carriage outwardly away from the track when the carriage train is being moved.

The illustrated fixed-length connecting means or links 42 are provided by simple rods of metal or the like.

Variations in the effective length of the train of carriages may be compensated for by providing means for the expansion and contraction of the train. Such means are provided by the variable-length connecting means 44. As shown best in FIG. 2, the connecting means or links 44 may be comprised by a pair of coil springs 80 interconnected by an adjustable turnbuckle 82. This arrangement not only permits automatic variation in the overall length of the carriage train, but also permits the spring tension to be varied to accommodate various situations. For example, the nature of the assembly job being done may require unusual stability so that it is desirable to introduce additional friction into the system to limit inadvertent movement of the carriages while the carriage train is stopped. As another example, it may be desirable from time to time to adjust the tension on the carriage train to compensate for a loss of tension from extended use.

As shown best in FIG. 5, a power unit comprising the drive means 46 and the control means 48 is secured as by means of bolts 86 to the track 22. More particularly, a shallow pan 88 having an upwardly turned peripheral lip 88a is supported beneath the table top 14 at one side of the workbench (FIG. 1) by means of a connective block 90 and a backup plate 92. The pan 88 supports a gear motor arrangement 94 beneath it, with a vertical output shaft 96 driven by the motor extending upwardly through the pan. The shaft 96 has secured to its upper end a drive sprocket 98 (FIG. 3) flexible conveyor means or member which in the exemplary embodiment comprises a link roller chain 100 extends around the drive sprocket 98 and an idler sprocket 102. The sprockets are arranged so that one run 104 of the flexible conveyor member, such as a cable, belt or chain, extends generally parallel to a straight section 26 of the track. The roller chain 100 is provided with one or more specially designed block link 106 having a drive finger or projection 108 that extends outwardly from the side of the roller chain. As shown in FIGS. 2, 3, 5, 6 and 8, the illustrated carriage 40 is provided with a vertical, driven pin or projection 110 that extends downwardly from the rear margin portion of the carriage bottom wall 52. The pin 110 is positioned so that when its carriage is adjacent to the roller chain 100, the pin is in the path of the drive finger 108 carried by the chain. Thus, the finger 108 will move a carriage generally from position A to position B as shown in FIG. 3. As the roller chain 100 continues to rotate, the finger 108 will engage the pin 110 on the next carriage which is positioned at position A and will move it to position B. It is apparent that by moving one of the carriages, the entire train of carriages is moved around the track.

The illustrated construction includes a switch mechanism 112, as shown in FIGS. 3 and 5, which is actuated by the finger 108 as the finger passes around the drive sprocket 98. This serves to stop, through suitable circuitry, the drive means 46. The carriages will remain stopped in this position until the drive means 46 is again actuated either manually or automatically by the control means 48.

It will be noted in FIG. 3 that the back-up bar 92 serves to support the outward run 104 of the roller chain 100 against inward deflection when the finger 108 engages the pin 110 on the carriage. It will be noted that the ends 92a and 92b of the bar 92 are tapered and brought into close proximity to the sprockets 102 and 98 respectively to prevent undesired inward movement of any substantial portion of the roller chain run 104. This is particularly important adjacent the idler sprocket 102 since without this additional support a portion of the roller chain 100 and the finger 108 might be cammed rearwardly by the carriage pin 110 so that they are wedged between the back up bar 92 on the inward side and the carriage pin 110 and the outward lip 88a of the pan 88 on the outward side.

Suitable means may be provided for locking the carriage 40 in a fixed position relative to the track. This is particularly desirable when the carriages are manually and/or individually movable. This may be provided, as shown in FIG. 4, by replacing the pin 110 with a thumb screw 114 that extends through the bottom wall 52 to releasably engage the undersurface of the track 22.

Thus, a relatively simply and economical work advancing unit is provided by the illustrated combination. Work carrying mobile carriages, which are readily assembled and disassembled from the track, are securely positioned when assembled, yet provide relatively low resistance to movement along the track. The carriages are maintained on the track in this manner even around the curves. The illustrated carriages are constructed and arranged for effective and convenient positioning of the work. The illustrated construction also includes means for adjusting the tension on the carriage train as may be desired.

Various modifications and changes may be made in the illustrated structure without departing from the spirit and scope of the present invention.

Various features of the present invention are set forth in the following claims.

What is claimed is:

1. In a multiple-station work supporting and advancing apparatus including a continuous endless track with a support edge defined by angularly related surfaces and having curved portions and at least one generally linear portion, a plurality of carriages for supporting work holders mounted on the track for movement therealong, a plurality of means interconnecting adjoining carriages, and means for moving the carriages along said continuous endless track, the improvement wherein each of said carriages comprises:
   a generally elongated channel-shaped body portion having an outer wall disposed outwardly of the track and a top wall disposed above the track;
   at least one support roller rotatably mounted on said top wall adjacent each end of said carriage, said support roller having a circumferential groove engaging the support edge of said track for supporting said carriage; and
   at least one guide roller carried on the lower end of the carriage adjacent each end for engaging another surface of said track.

2. The improvement of claim 1 wherein said track support edge is defined by planar upper and side surfaces disposed at substantially a right angle, and said support rollers have an axis of rotation generally normal to a plane bisecting said right angle.

3. The improvement of claim 2 wherein said support rollers circumferential groove has flat side surfaces inclined to one another, and means for preventing lateral movement of said carriage relative to said track including said circumferential groove flat side surface adjacent the side surface of said track, and stop means carried by said carriage disposed adjacent to an opposite side surface of said track.

4. The improvement of claim 3 wherein said support rollers circumferential groove flat side surfaces are inclined to one another at an obtuse angle to thereby provide clearance between respective groove and track surfaces and to minimize the area of contact between said surfaces so as to reduce drag and sliding therebetween.

5. The improvement of claim 1 wherein each of said carriage body portions includes a lower leg extending immediately below said track to limit direct upward displacement of the carriage relative to the track, whereby the support roller is maintained on the track incident to movement of the carriage along the track.

6. The improvement of claim 5 wherein the track includes a lower surface, and each of said carriages includes manually operable locking means for releasably securing the carriage in fixed position along the track, said locking means including a pin mounted on said carriage lower leg and movable upwardly to abut said track lower surface.

7. A work advancing construction for movement of work pieces between spaced work stations arranged other than in a straight line, said construction comprising:
   a work table;
   a continuous endless track extending around said work table and including at least one curved section, said track having an upper surface and an adjoining side surface disposed with respect to said upper surface at an angle of no more than substantially 90° so as to define a carriage support edge;
   a plurality of work supporting carriages mounted on said track for movement therealong, each of said work supporting carriages including, a generally channel-shaped body portion having a web disposed outwardly of said track and an upper web extending above said track, at least one support roller mounted on said upper web and having a circumferential groove engaging the carriage support edge of said track for supporting said carriage, and at least one guide roller carried on a lower portion of said carriage for engaging another side surface of said track opposite to said first-mentioned side surface;
   means for moving said plurality of carriages along said track; and
   means for interconnecting adjoining carriages including a plurality of fixed length connecting means and at least one variable length connecting means.

8. The construction as defined in claim 7 wherein at least two of said carriages have a driven projection extending transversely to the direction of travel of said carriage, and said means for moving said carriages along said track includes an endless flexible conveyor member driven around at least two spaced sprockets with one run of the flexible conveyor member extending generally parallel to a portion of said track, said flexible conveyor member including at least one drive projection extending outwardly towards said track to engage the driven projection on one of said carriages when said carriage is on the portion of the track parallel to the flexible conveyor member to thereby move said carriage along said track.

9. The construction as defined in claim 8 wherein said means for moving said plurality of carriages along said track includes a backup bar disposed opposite said one run of said flexible conveyor member from said generally parallel track portion in close proximity to said one run, said bar including extension means at least at the rear end of said run extending into the region where said run diverges from the associated sprocket, to thereby prevent jamming of said at least one drive projection and associated portion of the flexible conveyor member between the bar and the carriage.

10. The construction of claim 8 wherein said variable length connecting means includes spring means for varying the distance between said adjoining pair of carriages, and means for varying the tension of said spring means.

11. A work advancing construction for movement of work pieces between spaced work stations, said construction comprising:
a work table;
a continuous endless track extending around said work table and including two linear sections interconnected by two arcuate sections, said track having a planar upper surface with a longitudinal inner support edge defined by the upper surface and an inner side surface, and an outer side surface;
a plurality of work-supporting carriages mounted on said track for movement therealong, each of said work supporting carriages including, a generally channel-shaped body portion having a leg disposed outwardly of the track generally parallel to the track outer side wall and a top leg disposed above the track generally parallel to the track upper surface and including an inclined leg portion, a pair of spaced apart support rollers mounted on said upper leg inclined portion for rotation about an axis non-parallel with said track upper surface and track side surface, said roller having a circumferential groove engaging the inner support edge of said track for supporting said carriage, and at least one guide roller carried on a lower portion of the carriage for engaging said track outer surface;
means for moving said plurality of carriages along said track; and
means interconnecting adjoining carriages including variable length connecting means allowing for the distance between adjoining carriages to vary said carriages pass from the linear to the arcuate sections of the track.

References Cited

UNITED STATES PATENTS

| 1,398,514 | 11/1921 | Healy | 198—181 |
| 2,810,595 | 10/1957 | Purdy | 287—60 |

FOREIGN PATENTS 749,187 12/1966 Canada.

RICHARD E. AERGERTER, *Primary Examiner.*